US006016556A

United States Patent [19]

Heath

[11] Patent Number: 6,016,556

[45] Date of Patent: Jan. 18, 2000

[54] SYSTEM FOR IDENTIFYING AN ACQUISITION SAMPLE CORRESPONDING TO A SOURCE CODE STATEMENT

[75] Inventor: Robert J. Heath, Aloha, Oreg.

[73] Assignee: Tektronix, Inc., Wilsonville, Oreg.

[21] Appl. No.: 08/895,544

[22] Filed: Jul. 17, 1997

[51] Int. Cl.[7] .......... G06F 11/00

[52] U.S. Cl. .......... 714/38

[58] Field of Search .......... 395/704, 705, 395/706, 712, 183.14

[56] References Cited

U.S. PATENT DOCUMENTS

| | | | |
|---|---|---|---|
| 4,694,420 | 9/1987 | Pettet et al. | 395/183.14 |
| 4,937,740 | 6/1990 | Agarwal et al. | 395/183.14 |
| 5,142,679 | 8/1992 | Owaki et al. | 395/183.14 |
| 5,442,777 | 8/1995 | Nakajima et al. | 395/183.14 |
| 5,758,162 | 5/1998 | Takayama et al. | 395/705 |

*Primary Examiner*—Robert W. Beausoliel, Jr.
*Assistant Examiner*—Pierre Eddy Elisca
*Attorney, Agent, or Firm*—James H. Walters; Thomas F. Lenihan

[57] ABSTRACT

A system and method for locating a data sample in a logic analyzer or emulator acquisition buffer corresponding to a source code statement employs first and second windows, wherein one window displays the contents of the acquisition buffer, for example, in disassembly form and the other window displays source code. When a source code file is displayed and a specified statement is selected within the source code, a search for a matching sample in the acquisition buffer is initiated. If a sample is found, it is displayed and highlighted in the appropriate window.

10 Claims, 4 Drawing Sheets

```
                    Home/demo/demo.x
File View Configure                                    Help

 Previous Line   Next Line   Data Viewer: DAS/TLA mrdas;Address
                             Source File:         Home/demo/demo.c
33
34      /* Instantiate different states of the two traffic signals */
35      lights(0) = 0xde;  /* SIGNAL1: Green   SIGNAL2: Red */
36      lights(1) = 0xf6;  /* SIGNAL1: Yellow  SIGNAL2: Red */
37      lights(2) = 0xfc;  /* SIGNAL1: Red     SIGNAL2: Red */
38      lights(3) = 0xed;  /* SIGNAL1: Red     SIGNAL2: Green */
39      lights(4) = 0xf9;  /* SIGNAL1: Red     SIGNAL2: Yellow */
40      lights(5) = 0xfc;  /* SIGNAL1: Red     SIGNAL2: Red */
41
42      /* Initialize the queue */
43      initQueue();
44
45      /* Add the different states to the queue */
46      for ( i = 0; i < NUM_STATES; i ++ ){
47          chat_in = lignts(i);
48          enqueue( char_in );
49      }
50
51      /* Loop forever doing the following;
52          -Remove a state from the queue
53          -Adjust the traffic signals to reflect that state
54          -Pause for a fixed delay
55          -Put the state displayed back in the queue
56      /*
57      while (queueEmpty() == FALSE) (  /* is queue empty? */
58          char_out = dequeue();
59          light_leds( char_out );
```

54 — (code window label)

10A Support
Timestamp

| | | | |
|---|---|---|---|
| | | | 2.000 us |
| | | | 2.500 us |
| | | | 500 ns |
| | | | 1.750 us |
| | | | 430 ns |
| | | | 820 ns |
| | | | 490 ns |
| | | | 15.010 us |
| | | | 210 ns |
| | | | 2.280 us |
| | | | 1.510 us |
| 1190 | queue_50.27+6  | 207C | MOVEA.L  #00C05AA0,A0           | 2.490 us |
| 1194 | queue_50.27+C  | 11AE | MOVE.B   000B(A5),00(A0,D0.W)   | 2.010 us |
| 1198 | queue_51.19    | 7001 | MOVEQ    #01,D0                 | 1.950 us |
| 1200 | queue_53.1     | 4E5E | UNLK     A6                     | 1.300 us |
| 1201 | queue_53.1+2   | 4E75 | RTS                             | 500 ns |
| 1207 | demo_48.24+E   | 588F | ADDQ.L   #4,SP                  | 3.000 us |
| 1208 | demo_46.35     | 5282 | ADDQ.L   #1,D2                  | 430 ns |
| 1209 | demo_46.31     | 7005 | MOVEQ    #08,D0                 | 570 ns |
| 1210 | demo_46.31+2   | B082 | CMP.L    D2,D0                  | 490 ns |
| 1211 | demo_46.31+4   | EEE4 | BGT      demo_47.26             | 1.510 us |
| 1213 | demo_47.26     | 1835 | MOVE.B   FA(A6,D2.W),D4         | 1.120 us |
| 1215 | demo_48.24     | 1004 | MOVE.B   D4,D0                  | 1.310 us |

F2 SPLIT DISPLAY    F4 MARK DATA    F5 DEFINE FORMAT

SELECT   PAGE        SCROLL
NEXT PREV   UP DOWN   ◁◁ ◁ ▷ ▷▷   PRINT  NOTES  MENU

CONFIG  CHAN  CLOCK  TRIG  STATE              DISK  DATE

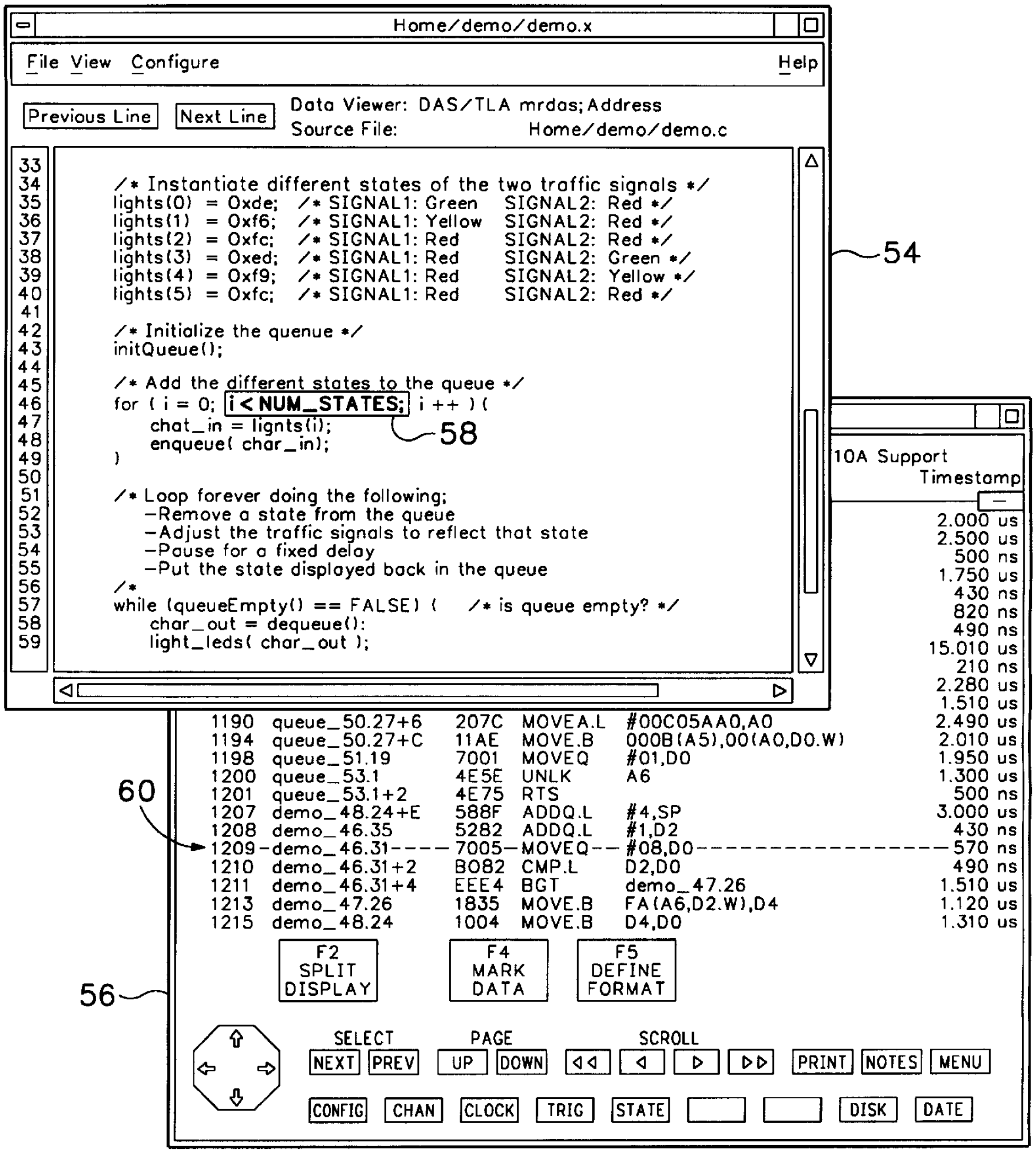

FIG.6

SYSTEM FOR IDENTIFYING AN ACQUISITION SAMPLE CORRESPONDING TO A SOURCE CODE STATEMENT

BACKGROUND OF THE INVENTION

This invention relates to test and measurement systems and, more particularly, to a system for determining an acquisition sample obtained by an instrument which corresponds to a software source code statement.

In earlier days, engineers typically wrote control code for test and measurement systems in assembly language, a low-level language. Today, however, to improve development time and to enable greater functionality and complexity to be developed in shorter time, engineers typically employ high-level languages, for example C, C++, etc., to develop products. The high-level language is converted into machine code for operation on the particular processor, by a compiler/assembly/linker system, which generates assembly language and/or machine code based on the high-level source code. When debugging, the engineer must work with the low-level machine code, which typically is converted to assembly language by the debugger to aid in the understanding thereof. However since the engineer did not write the software in assembly language and since the engineer may be unfamiliar with the methods employed by the compiler to generate assembly language code corresponding to various source code statements, it becomes complicated for the engineer to understand the exact operation of the system during debug.

In accordance with the prior art, it is necessary that a user select an acquisition sample and then attempt to locate a corresponding source code statement. Also, such prior systems allow searching for an acquisition sample which corresponds to the next or previous source code statement in execution order. However, there are no systems in the prior art which enable selection of a source code statement at random from any of the source code files used to generate the executable code and which then locate a matching sample in an acquisition buffer/disassembly file.

Current test instruments, for example logic analyzers, are sophisticated devices which include extensive software support systems for governing the operation of the instruments. Some of these support systems include debugging systems, which enable an engineer using a test instrument to perform real-time characterization and debugging of an embedded system where acquired data includes (in the case of a microprocessor system) bus transactions and the like that occur during the operation of the system.

In accordance with the prior art, debugging systems were employed where the engineer debugging a system would have to trace through acquisition samples, line by line. For example, if the engineer was interested in a particular data sample that had been acquired by the system, and the corresponding source code was displayed in a debug window on a workstation, the engineer might not know what source code statement corresponded to the particular data sample, as the data samples could typically have resulted from any one of many different modules, depending on the operational characteristics and flow of the controlling software. Accordingly, if the engineer is viewing a particular source code line with the debugger, the engineer would have to make some sort of educated guess as to where a corresponding data sample might have been acquired in the acquisition buffer, and trace through a number of samples, hoping that the guess was correct and that the conditions of the source statements were appropriately met such that the desired sample did in fact appear in the acquisition buffer. This might involve stepping through multiple samples in the acquisition buffer, which was annoying for the engineer as often the particular acquisition sample could not be reached in the debugger without stepping through a great many acquisition samples, with no guarantee that the sought after sample was present in the acquisition buffer at all.

SUMMARY OF THE INVENTION

In accordance with the invention, a system for identifying an acquisition sample corresponding to a source code statement is provided wherein high-level data (source code) is linked to low-level acquisition data. Cursors in the high-level and low-level data move to corresponding locations when the cursor in the other view is moved.

Accordingly, it is an object of the present invention to provide an improved system for debugging.

It is a further object of the present invention to provide an improved system for correlating cursors between two data sets.

It is yet another object of the present invention to provide an improved system for debugging wherein a cursor in low-level data is moved to a corresponding statement when a cursor in high-level data is moved.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

BRIEF DESCRIPTION OF THE DRAWINGS

FIG. 1 is a block diagram of a system according to the present invention wherein the system is adapted for use with a source code viewer, debugger or the like;

FIG. 6 is a view of sample acquisition windows illustrating high-level source code and assembly code information corresponding to acquired data.

DETAILED DESCRIPTION

The system according to a preferred embodiment of the present invention comprises a high-level source code data viewer which is linked to a low-level acquisition data viewer wherein movement of a cursor and issuance of a search command in one data viewer results in corresponding movement of the cursor in the other data viewer to indicate a corresponding location, if such a location is found. High-level data as employed herein suitably comprises source code, for example, while low-level data can comprise, acquired data, object code, assembly code, etc.

Figure 1:
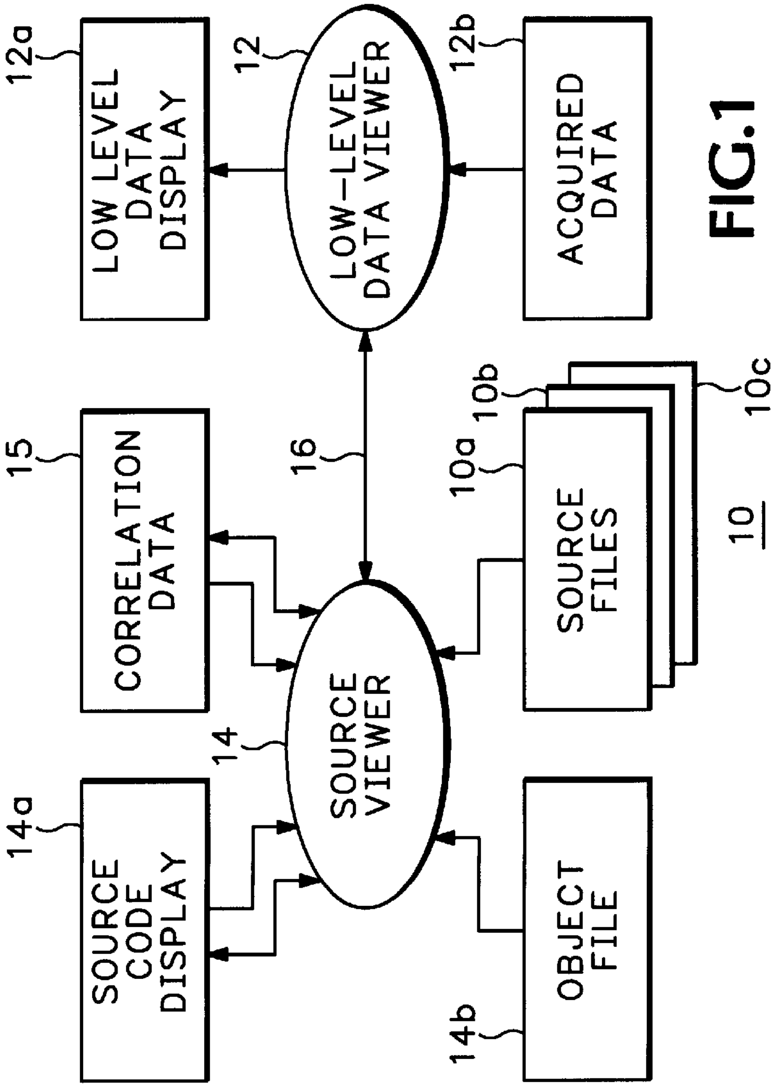

Referring now to FIG. 1, a block diagram illustrating the structure of a system 10 employing the present invention, a low-level viewer which may comprise an assembly language viewer 12 (and which may operate by disassembly of object code) and a high-level data viewer, which may comprise a source code viewer 14 or alternatively a debugger, are linked by a communication channel 16 according to the present invention. Communication channel 16 passes the relative cursor commands between the high-level and low-level viewers to instruct the other viewer (or debugger) to move its cursor to an appropriate position. A computer, workstation or the like runs the viewers and the other processes of the invention.

A source code display 14*a* is provided for displaying source code statements. A low level data display 12*a* is provided for displaying object code. Low level data viewer 12 receives acquired data from an acquired data source (i.e., acquisition buffer) 12*b*.

In use, the system employs debug information provided by, for example, a compiler, wherein the debug information is typically stored in the object file 14*b* generated by the compiler. This debug information would include source code file name, line and sometimes column data which correspond to statements in the object file. In accordance with the present invention, when a source file 10*a*, 10*b*, 10*c* is opened, a corresponding object file is opened and read and correlation data 15, which may comprise, for example, a look-up table, is generated to map the source code statements to addresses. Alternatively, rather than open the object file, a separate program may first extract the debug information from the object file and store it in a separate symbol file, which is read by the source code viewer in place of reading the object file directly.

Figure 2:
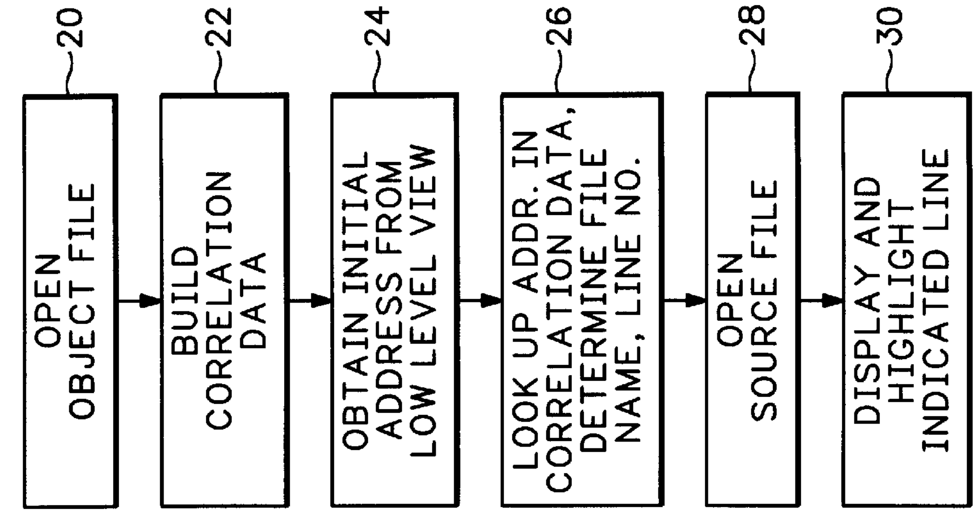
FIG. 2 is a flow chart illustrating execution steps in performing the invention when an object code file is opened.

Referring now to FIG. 2, a flow chart of the execution steps in performing the invention when an object or symbol file is opened, at step 20, the object or symbol file is opened, then using the debug information present in the object or symbol file, correlation data is then derived (step 22) to associate ranges of addresses in the executable/object file with source file names, line numbers and sometimes with specific columns in a source file. At step 24, an initial address value is obtained from the low-level data viewer. Using this address and the correlation data constructed at step 22, the name of the corresponding source file is determined (step 26) and that source file is opened (step 28). The contents of the source file are displayed by the high-level viewer. In step 30, the high-level viewer display is adjusted so that the specific line of the source file indicated by the correlation data is visible and that line is suitably highlighted. The correlation data is retained for use in locating corresponding statements in the low-level view as discussed hereinbelow.

When a user selects a source code statement in a source file, by clicking, for example, a mouse button when the pointer is on that source code statement, a corresponding address range is determined from the correlation data. A search command is derived and used to initiate a search of the low-level data buffer starting at the location either immediately before or immediately after the current cursor location, for an acquisition sample with an address value within the specified range. If such a sample is found, the acquisition buffer window in the low-level viewer is repositioned to display the appropriate sample and the cursor is positioned to that sample.

The rules for searching in a preferred embodiment are as follows:

If the source code statement position to be searched for is farther down in the source file than the current cursor position, the search is initiated in a forward direction.

If the source code statement to be searched for is earlier in the file than the current cursor position, then the search is initiated in a backward direction until such time as the data is found.

A further feature of the invention is that the search directions may be reversed merely by selection of an alternate button on a mouse 49 (see FIG. 4), for example. Accordingly, selecting a source statement with the left mouse button 51 results in a forward search if the source statement is further in the file than the current position and selecting a source statement with the right mouse button 53 results in a reverse search given the same source code line positions.

The above noted rules and search features are employed in a preferred embodiment, but other rules may be chosen and suitably employed.

The system does not limit the user to selecting lines from the currently displayed source file. The user can choose to display any source file from a list and may then select a source code line from that file. The files on the list of available source files are those which were used to create the object file specified by the user. Typically, these file names are determined from debug information in the object or symbol file.

Figure 3:
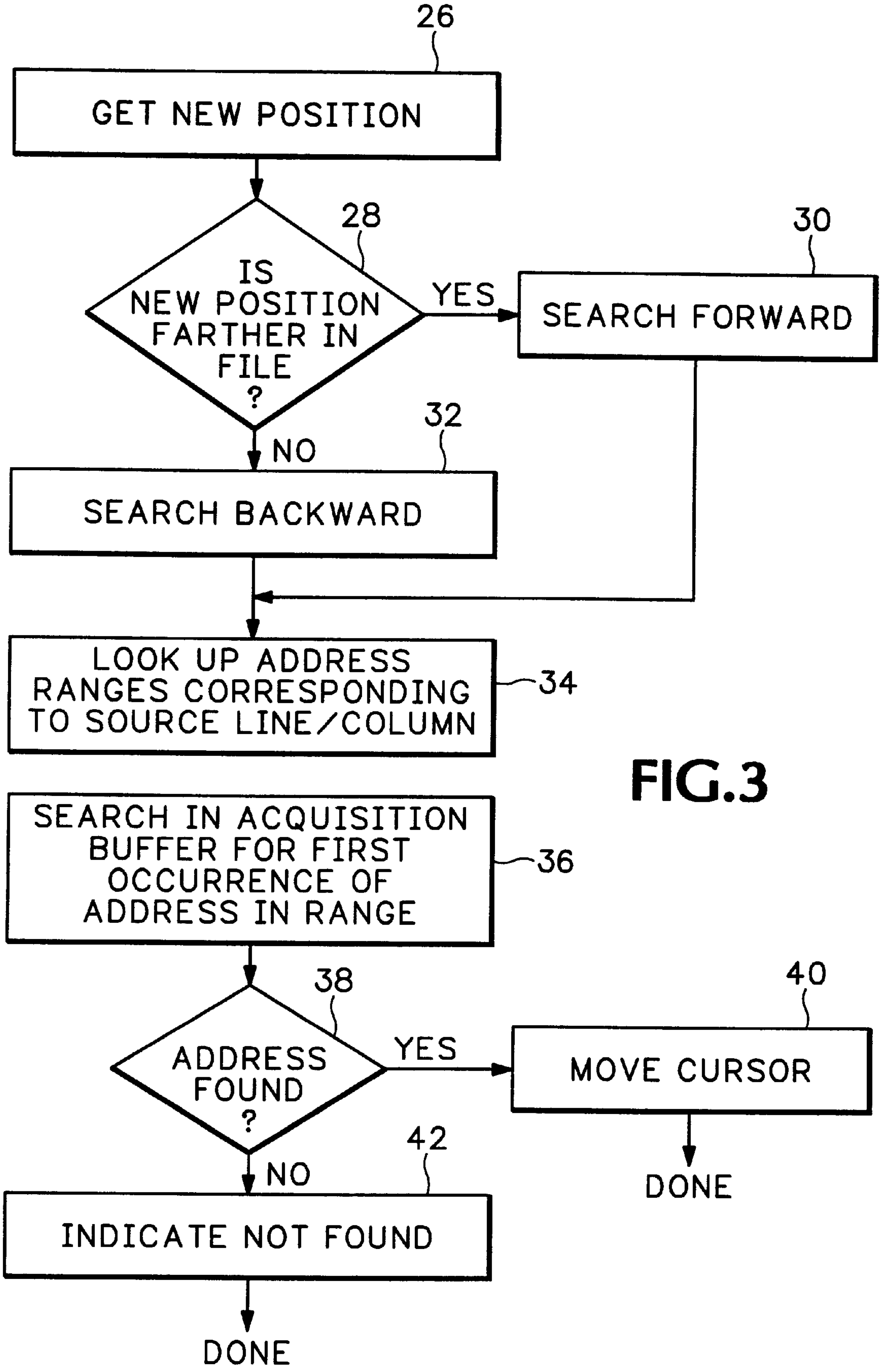
FIG. 3 is a flow chart of the execution steps in performing the search aspects of the present invention.

Referring now to FIG. 3, which is a flow chart of the steps of locating a statement corresponding to a source statement, first the new cursor position (which is the source statement for which corresponding low-level data is to be located) is obtained in step 26 and a decision is made whether the new position is farther down in the file than the previous position in decision block 28. If the position is farther down, then the direction of further searching to be performed is set to a forward direction (step 30). If not, the search direction is set to be backward (step 32). Next, a range of addresses that correspond to the selected source code line are determined from the correlation data which was earlier generated (step 34). Next, the search is initiated in the acquisition buffer for the first occurrence of a corresponding address in the range determined from the correlation data (step 36). If found (decision block 38), then the cursor is moved in the low-level data view (step 40). If no corresponding address ranges are found before reaching the end of the acquisition buffer, then an indication is made (step 42) of that condition, by displaying, for example, a dialog box to that effect.

For any selected source code statement, there can be either zero samples, one sample or more than one corresponding sample in an acquisition buffer, since in a given set of acquisition data (which was obtained during a run of an instrument, for example), conditions may have existed which resulted in a particular source statement being executed one, many or zero times. As those skilled in the art will realize, source code statements are not necessarily executed in order according to their place in a source code file, or if the source statements are in separate files, the order of execution of the various statements is somewhat unpredictable. Further, matching samples may occur multiple times as a source file statement could be within a loop which is executed many times. It will be understood therefore, that the search direction rules described heretofore are based on assumptions and there is no guarantee that the direction of search is correct, or that the search target even exists in the acquisition buffer.

In a particular embodiment, the invention is employed with a logic analyzer and device under test.

Figure 4:
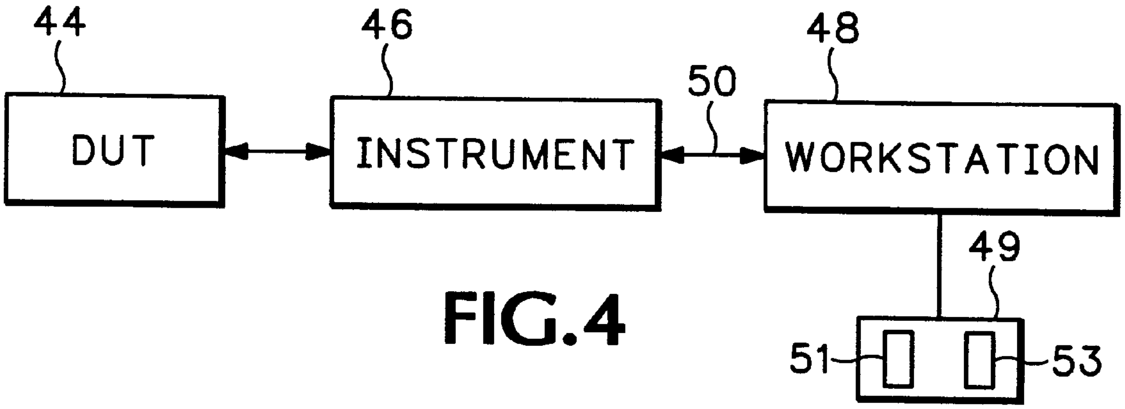
FIG. 4 is a block diagram of a typical arrangement used in employing the present invention.
Figure 7:
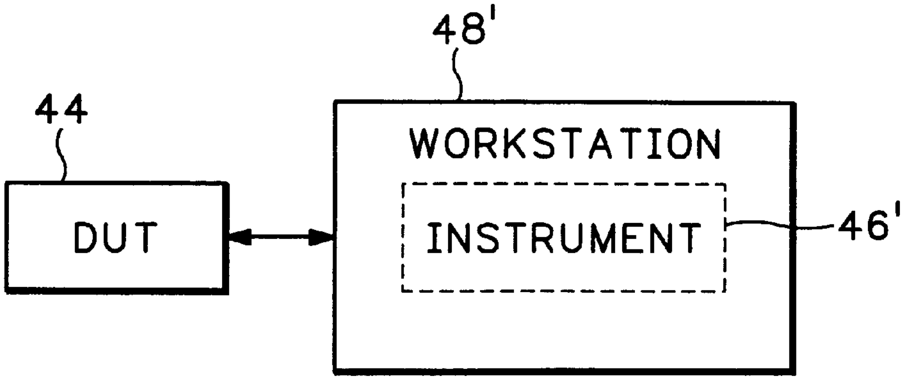
FIG. 7 is an alternate embodiment of the typical arrangement of FIG. 4, wherein the instrument and the workstation are the same unit.

FIG. 4 is a block diagram of a typical arrangement used in employing the present invention, wherein a device under test 44 is connected to an instrument 46 (e.g., a logic analyzer, an emulator, etc.) and the instrument 46 is interconnected with a workstation 48. Workstation 48 displays run time data (e.g., disassembled for easier study by the engineer) from the instrument and also includes the high-level source code operating the instrument as well. The workstation and instrument are connected via link 50, which may comprise a cable when the instrument and workstation are nearby. In certain situations, the instrument may be set up in a lab, while the workstation is in the engineer's office, and link 50 may comprise a network, where the instrument is remotely controlled and polled for data by the workstation. The workstation and instrument may also suitably be contained within the same unit, for example, as shown in FIG. 7, where a general purpose computer 48' is the workstation, and built-in or plug-in instrumentation module (or modules) 46' are provided.

Figure 5:
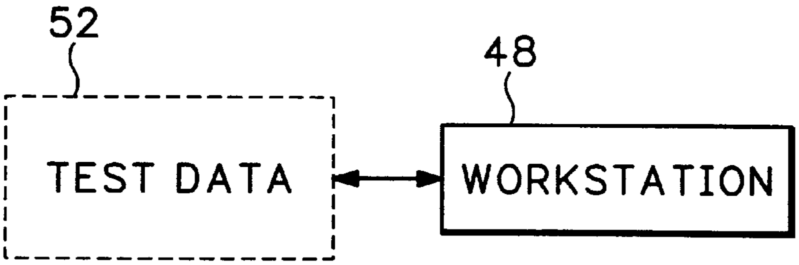
FIG. 5 is a view of an alternative operation environment employing the present invention.

Alternatively, as shown by FIG. 5, the acquisition data from the instrument and device under test may be captured during a real-time run of the instrument and saved as test data 52. The engineer may then view the saved test data at some other time, freeing the lab, instrument and device under test for use by other engineers.

FIG. 6 is a view of example windows as displayed on workstation 48, wherein window 54 comprises high-level "c" source code statements of a system being observed by instrument 46. Window 56 comprises the corresponding low-level disassembled object code acquired by the instrument. In source window 54, a portion of line 46 of a file "demo.c" is highlighted at 58, "i<NUM_STATES;". This display was generated when the engineer initiated a search for a corresponding statement in window 56 by clicking a left mouse button, resulting in the located corresponding assembly code in window 56, "MOVEQ #08, D0", being highlighted (indicated by dash line 60).

While the examples shown herein relate to searching for assembly or low-level statements corresponding to high-level source code, alternatively, the searching may be done in an opposite manner, wherein a selected statement in the low-level data is employed to initiate a search for corresponding statements in the high-level data. A reverse correlation, which may comprise a look-up table (e.g. an existing table with a different index), is employed to correlate the low-level addresses with the high-level source statements. The acquisition buffer may be a trace buffer for example, and acquired data referred to herein may suitably comprise data that was previously acquired and then saved in a file.

While the illustrated embodiment suitably employs a look-up table as the correlation data to achieve high- to low-level correlation, it will be understood that the invention is not limited to this method and structure. For example, in place of a look-up table, the system can be implemented to derive the address range corresponding to a high level data selection by reading the debugging information from the object file each time a correlation is to take place. Those skilled in the art will appreciate that other types of data structures are also suitably employed to achieve the correlation.

Accordingly, the present invention provides an improved system for correlating high-level and low-level views, for example, of acquired real-time test data for an instrument under test employing high and low-level source data, for example. The system enables selecting statements at random (as opposed to Next or Previous) in either view then searching forwardly or backwardly in the alternate view, to locate corresponding statements from the other view. A test engineer is then able to more quickly view source code statements and their corresponding low-level statements without the need to step through data or statements one item at a time.

Typical problems which a user of a system according to the present invention will be resolving are the detection of the source of memory corruption problems, timing and performance issue resolutions, and other related anomalous behaviors which may appear only during a full-speed operation of a system or problems which may occur only after many hours of operation of a system.

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

I claim:

1. A system for identifying an acquisition sample corresponding to a source code statement, comprising:

a user-operable data entry device for selecting a particular source code statement;

a correlator for correlating the address of an acquisition sample to said selected source code statement; and a search system for initiating, in response to said selection of said particular source code statement, a search in acquisition sample data for an acquisition sample having an address range within a range corresponding to a correlated range for said selected source code statement;

wherein said correlator comprises a look-up table;

wherein said command receiving means indicates either forward searches or backwards searches within the acquisition sample data;

wherein said pointer device is employed by a user to select a source code statement for which a corresponding acquisition sample is to be located;

wherein said pointer device has first and second selectors, and wherein on actuation of the first selector, said search system searches in a first direction and on actuation of the second selector, said search system searches in a second direction.

2. The system according to claim 1 wherein said acquisition sample data includes object code data.

3. The system according to claim 1 wherein said acquisition sample data includes assembly or disassembly code data.

4. The system according to claim 1 wherein said source code statement includes source code data.

5. The system according to claim 1 wherein said source code statement includes assembly language source code data.

6. A method for identifying an acquisition sample corresponding to a source code statement, comprising:

receiving a data entry which causes selection of a particular source code statement;

determining, in response to said reception of said data entry, a range of addresses corresponding to said particular selected source statement;

searching through low-level data for addresses corresponding to said determined range of addresses; and if a corresponding address is found, moving a cursor in the low-level data to a position corresponding to the found address;

wherein said determining step comprises looking up an address range in a look-up table; and further comprising the steps of:

searching through the low-level data in a first direction in response to a first search command;

and searching through the low-level data in a second direction in response to a second search command.

7. The method according to claim 6 wherein said first and second search commands are received from a user via a pointer device.

8. The method according to claim 6 further comprising the step of generating the look-up table of low-level data addresses corresponding to high-level source statements.

9. A system for correlating low-level system information with high-level system information, comprising:

an interconnection system interconnecting the high and low-level information views, said interconnection system receiving cursor movement commands from the high-level information view and supplying search commands to the low-level information view;

data input apparatus for receiving a user-entered data entry which causes selection of particular information from said high-level information view;

said system determining, in response to said reception of said data entry, a range of addresses corresponding to said particular selected high-level information; and a search system for initiating a search in acquisition sample data for an acquisition sample having an address range within a range corresponding to a correlated range for a selected source code statement;

further comprising look-up information correlating locations in the high-level information with ranges of locations in the low-level information;

wherein said interface means indicates either forward searches or backwards searches within the low-level information;

wherein said interface means comprises a pointer device, wherein said pointer device is employed by a user to select high-level information for which corresponding low-level information is to be located; and wherein said pointer device has first and second selectors, and wherein on actuation of the first selector, said search system searches in a first direction and on actuation of the second selector, said search system searches in a second direction.

10. The system according to claim 9 wherein said low-level information includes object code data, assembly code data or disassembly code data.

* * * * *